US009147087B2

(12) United States Patent
Lu et al.

(10) Patent No.: US 9,147,087 B2
(45) Date of Patent: Sep. 29, 2015

(54) METHOD OF ACCESSING A DATA STORAGE DEVICE

(75) Inventors: Hai Xin Lu, Singapore (SG); Mi Mi Aung Khin, Singapore (SG); Sie Yong Law, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 535 days.

(21) Appl. No.: 13/145,633

(22) PCT Filed: Jan. 23, 2009

(86) PCT No.: PCT/SG2009/000033
§ 371 (c)(1),
(2), (4) Date: Oct. 3, 2011

(87) PCT Pub. No.: WO2010/085211
PCT Pub. Date: Jul. 29, 2010

(65) Prior Publication Data
US 2012/0008771 A1    Jan. 12, 2012

(51) Int. Cl.
*G06F 21/24*    (2006.01)
*G06F 21/80*    (2013.01)
*H04L 9/08*    (2006.01)

(52) U.S. Cl.
CPC ............ *G06F 21/805* (2013.01); *H04L 9/0891* (2013.01); *H04L 9/0894* (2013.01)

(58) Field of Classification Search
CPC .... G06F 21/805; H04L 9/0894; H04L 9/0891
See application file for complete search history.

(56) References Cited

U.S. PATENT DOCUMENTS

| 4,912,762 | A | 3/1990 | Lee et al. |
| 6,125,185 | A | 9/2000 | Boesch |
| 7,266,703 | B2 | 9/2007 | Anand et al. |
| 2008/0260159 | A1 | 10/2008 | Osaki |
| 2009/0034733 | A1* | 2/2009 | Raman et al. ................. 380/277 |
| 2010/0128874 | A1* | 5/2010 | Scott-Nash ................... 380/255 |

OTHER PUBLICATIONS

Singa Supraman, Khin Mi Mi Aung, Liow Chen Hong, Lu Hai Xin, Tan Chin Wee, Alvin, Wang Yong Hong Wilson and Wong Hsing Liang, Vivian SG 149704; filed on Jul. 12, 2007 and published on Feb. 27, 2009.
"Hardware-rooted trust for secure key management and transient trust", Jeffrey S. Dwoskin, Ruby B. Lee, Conference on Computer and Communications Security, Proceedings of the 14th ACM conference on Computer and communications security, pp. 389-400, Year of Publication: 2007, ISBN:978-1-59593-703-2.
"Chosen-ciphertext secure proxy re-encryption", Ran Canetti, Susan Hohenberger, Conference on Computer and Communications Security, Proceedings of the 14th ACM conference on Computer and communications security, pp. 185-194, Year of Publication: 2007, ISBN:978-1-59593-703-2.
"New Methods in Hard Disk Encryption", Fruhwirth C, Jul. 18, 2005. Flagstone Corporate <http://web.archive.org/web/20070708044953/http://www.flagstonesecure.com/flagstone_corporate.
aspx?navid=246> published on Jul. 8, 2007 as per Wayback Machine.

* cited by examiner

*Primary Examiner* — Brandon Hoffman
*Assistant Examiner* — Nega Woldemariam
(74) *Attorney, Agent, or Firm* — K. David Crockett, Esq.; Niky Economy Syrengelas, Esq.; Crockett & Crockett, PC

(57) ABSTRACT

A method of accessing a data storage device, the method including: transforming a first key to obtain a second key; assigning the second key to a logical unit of data of the data storage device; and using the second key to read data from the data storage device or to write data to the data storage device.

18 Claims, 11 Drawing Sheets

METHOD OF ACCESSING A DATA STORAGE DEVICE

FIELD OF THE INVENTION

The invention relates to a method of accessing a data storage device and a system for accessing stored data.

BACKGROUND OF THE INVENTION

Managing security keys used to encrypt and decrypt data is a challenging task. This is due to the difficulty in keeping track of different keys used to encrypt and decrypt data, wherein data associated with a respective security key has to be tracked as well.

Adhering to industry recommendations, such as from the Storage Networking Industry Association (SNIA), that security keys used to encrypt data should be changed at least once every 12 months adds to the difficulty of managing security keys. When re-keying cryptographic keys (i.e. changing cryptographic keys), cipher data first needs to be decrypted using their existing cryptographic key. Subsequently, the unencrypted data is re-encrypted using the new cryptographic key to obtain cipher data. These new cryptographic keys have to be tracked. In addition, the decryption and re-encryption utilises processing power in an enterprise storage system.

Storage systems using full disk encryption (FDE) provides a solution to security key distribution and revocation problems. In FDE, data blocks are encrypted at the disk level instead of switch and appliance level. FDE provides a lock key that is used to turn on a FDE data storage device. When re-keying is performed, the lock key can be changed without having to change the encryption key. However, FDE storage systems are not backward compatible with existing conventional data storage devices, such as legacy tape/disk.

Given that existing enterprise storage systems still use conventional data storage devices, there is a need to address the backward compatibility issue. Further, it would be advantageous to have a data storage system not needing to decrypt and re-encrypt data whenever re-keying is performed.

SUMMARY OF THE INVENTION

According to one aspect of the invention, there is provided a method of accessing a data storage device, the method including: transforming a first key to obtain a second key; assigning the second key to a logical unit of data of the data storage device; and using the second key to read data from the data storage device or to write data to the data storage device.

According to another aspect of the invention, there is provided a system for accessing stored data, the system including: a data storage modules a transformation module that transforms a first key to obtain a second key; an assignment module that assigns the second key to a logical unit of data of the data storage module; and a data access module that uses the second key to read data from the data storage module or to write data to the data storage module.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

Figure 1:
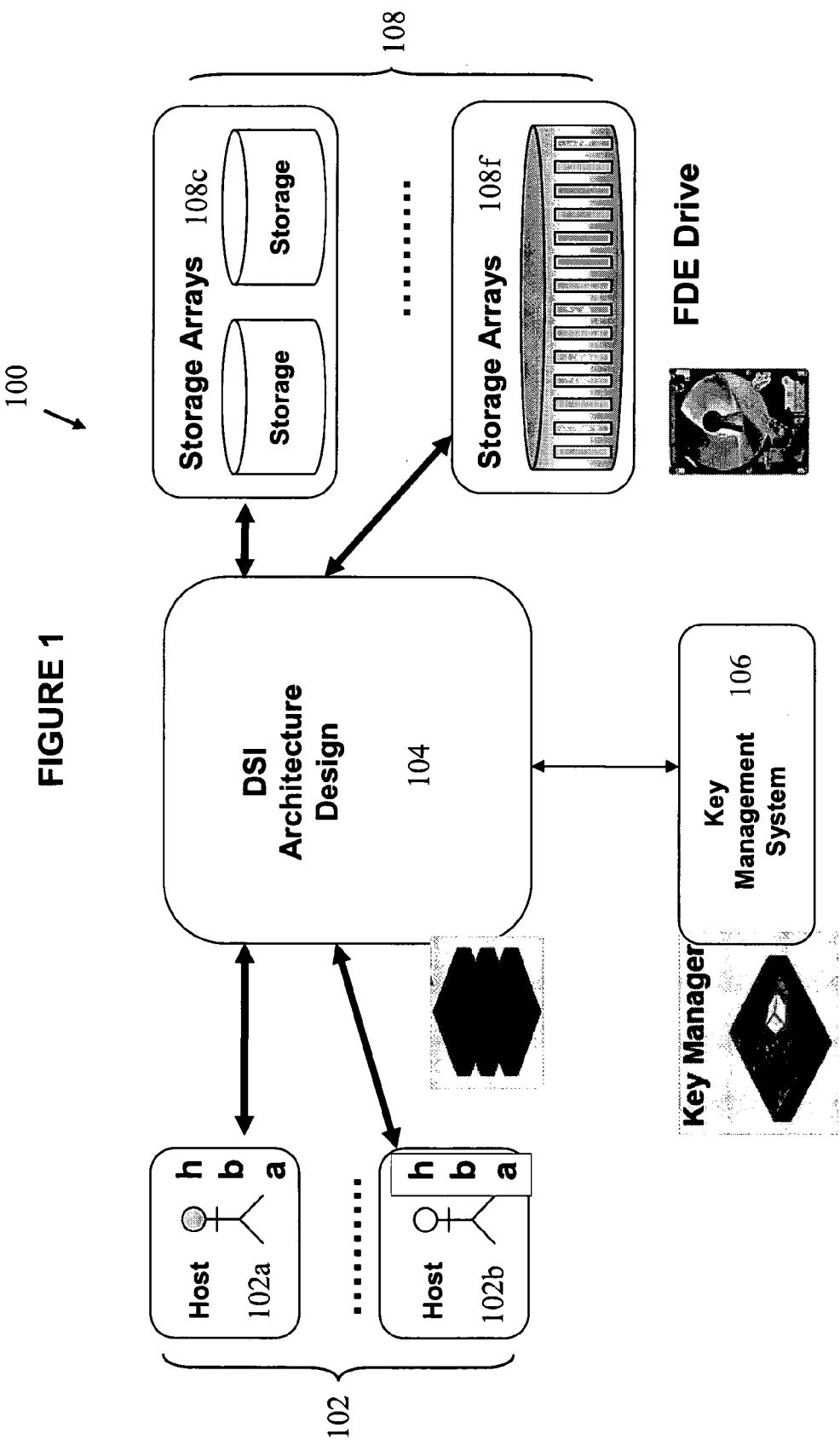
FIG. 1 is a block diagram representing architecture of a data storage system implementing one embodiment of the present invention.

FIG. 1 is a block diagram representation of a data storage system 100 implementing one embodiment of the present invention.

The data storage system 100 includes a plurality of host computers 102 and a plurality of data storage arrays 108. Data communicated between the plurality of host computers 102 and the plurality of data storage arrays 108 is managed by data security architecture (represented by block 104).

The data security architecture 104 serves the following purposes:

1. To encrypt data from the host computers 102 via channel protocols such as Fibre Channel or iSCSI command and pass the cipher data to the data storage arrays 108.
2. To decrypt cipher data from the data storage arrays 108 and pass the unencrypted data back to the host computers 102.
3. To manage security key lifecycles, which includes key generation, key distribution, key storage, key share, key recovery, key revocation and re-keying.

The data architecture 104 may be implemented in a switch device, an encryption appliance or disk level.

The data security architecture 104 uses a key management system 106 to manage security keys such as cryptographic keys that are used to secure data stored in the data storage arrays 108.

The function of the key management system 106 is to perform backup of the security keys in case of disaster recovery, where the security keys can be retrieved from the key management system 106 to the data security architecture 104. The key management system 106 may be integrated with the data security architecture 104 to share load balancing or may be separate from the data security architecture 104.

Data for storage in the data storage arrays 108 is organised into logical units, where each logical unit is assigned a logical unit number (LUN) by the data security architecture 104. The LUN provides a unique identifier to enable differentiation between separate disk storage devices so that data will be stored and retrieved from the assigned disk storage device within the data storage arrays 108.

In the embodiment shown in FIG. 1, storage array 108c represents conventional disk storage devices that store data which has already been encrypted externally. External encryption of the data to be stored can be performed for example in a separate switching device or in a separate encryption appliance device. A cryptographic key is used by the separate switching device or the separate encryption appliance device to encrypt or decrypt the data.

In the embodiment shown in FIG. 1, storage array 108f represents disk storage devices that employ full disk encryption (FDE). In FDE disk storage devices, data encryption occurs internally, through using an encryption key that exists at the disk level. For FDE drives that are manufactured, for example by Seagate, the encryption key is a standard AES128 key which always exists at the disk level and does not leave the disk. In addition, a FDE disk storage device has two additional security keys: a lock key and a transmission key.

The lock key is used to switch on the FDE drive. The lock key can be modified, such as after a time period, where changing the lock key would not affect the encryption key.

The transmission key for the FDE drive is a protocol and standard identified in the T10/T13 of the Trusted Computing Group to communicate between FDE drives and a disk controller.

To maintain data security, the Storage Networking Industry Association (SNIA) recommends that security keys that encrypt data at rest be re-keyed at least once every 12 months. The time interval for changing data security keys is defined by the National Institute of Standards and Technology as cryptainperiod.

For the conventional disk storage array 108c, changing data security keys involves decrypting the data and assigned LUN using the existing cryptographic key. The decrypted data and assigned LUN can then be encrypted using the new cryptographic key. The decrypting and encrypting processes utilise resources of the separate switching device or the separate encryption appliance. Thus, if the cryptographic key is frequently changed, the separate switching device or the separate encryption appliance would have to frequently repeat the process of decrypting and encrypting data, thereby affecting the performance of the data storage system 100.

In contrast with the conventional disk storage array 108c, changing data security keys for the FDE storage array 108f only involves changing the lock key in the FDE disks of the FDE storage array 108f. Decryption and encryption of the data stored in the FDE storage array 108f is not required. This is because data encryption occurs inside the FDE disk, where (as mentioned above) the encryption key never leaves the FDE disk. Thus, less resources are taxed when security keys have to be changed for the FDE storage array 108f and the performance of the data storage system 100 would not be so adversely affected.

By only having to change a lock key for each FDE disk when security keys are re-keyed, rather than having to change an encryption key for each logical unit of data, FDE technology provides a solution to the problem of managing encryption keys and managing the revocation of encryption keys. However, FDE is not backward compatible with conventional disks that employ external cryptographic keys to encrypt and decrypt data. This is because the FDE drive requires T10, T11 and T13 channel protocols as defined in the standards from the Trusted Computing Group to communicate with the FDE storage arrays. Conventional disks do not use these channel protocol standards.

Another factor that contributes to the difficulty of maintaining data security in existing data storage systems is that encryption keys, used in conventional disk storage devices employing external data encryption and decryption, are transparently stored in an encryption appliance. These encryption keys are internally stored on the flash or hard disk of the encryption appliance. A breach of security concern arises when an insider hacks into the flash or the hard disk by accessing the management console of the encryption appliance and steals the encryption keys. The encryption appliance is especially vulnerable, for example, during a key generation process. This is because when a host computer wants to store data on storage arrays (compare storage arrays 108 of FIG. 1), the encryption appliance will access the flash disk to retrieve the encryption key to encrypt the data. By accessing the management console of the encryption appliance, the hacker can steal the encryption keys from the flash or disk drive.

Figure 2:
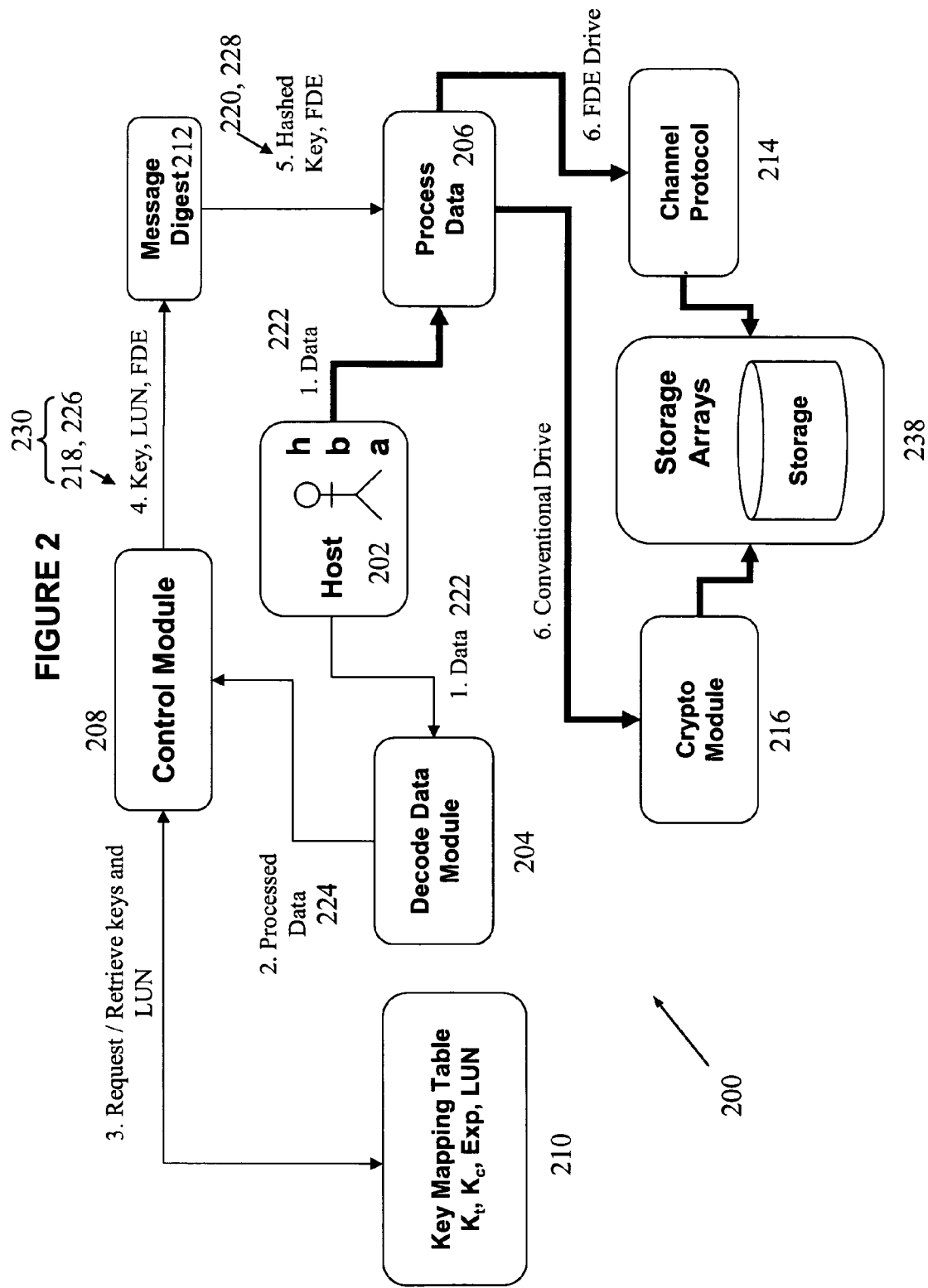
FIG. 2 shows a flowchart illustrating a process in accordance with one embodiment of the present invention.

The problems of backward compatibility of FDE disks and hacking of encryption keys from an encryption appliance are solved with reference to the flowchart of FIG. 2.

FIG. 2 shows a flowchart illustrating a process 200 in accordance with one embodiment of the present invention. It will be appreciated that the process 200 is implementable in the data security architecture 104 of FIG. 1.

The process 200 involves communication between the following components: a host 202; a decode data module 204; a process data module 206; a control module 208; a key mapping table 210; a transformation module 212; a channel protocol module 214; a cryptographic module 216 and a data storage device 238. In the embodiment shown in FIG. 2, the transformation module 212 is provided as message digest module 212.

The process 200 involves the implementation of a method of accessing the data storage device 238. The method includes transforming a first key 218 to obtain a second key 220. The second key 220 is assigned to a logical unit of data 222 of the data storage device 238, where the second key 220 is used to read data from the data storage device 238 or to write data to the data storage device 238.

The first key 218 is associated with both conventional disk storage devices (where data encryption and data decryption occur outside the data storage device) and FDE disk storage devices (where data encryption and the data decryption occur inside the data storage device). For the conventional disk storage device, the first key 218 acts as an additional key to the cryptographic key (i.e. the key used to decrypt and encrypt data stored in the conventional disk storage device), so that whenever re-keying is performed, only the first key 218 needs to be replaced, while the cryptographic key can remain unchanged to circumvent the need to undergo decryption and encryption of the stored data. For the FDE disk storage device, the transformed first key 218 (i.e. the second key 220) is used as a means to unlock the lock key of the FDE disk storage device.

The transformation of the first key 218 to obtain the second key 220 is a further key security enhancement feature. It is the second key 220 (i.e. the transformed key) that is assigned to a logical unit of data of the data storage device 238. The second key 220, rather than the untransformed first key 218, is then used to read data from the data storage device 238 or to write data to the data storage device 238.

In more detail, the process 200 begins with the host 202 firstly sending data 222 to the decode data module 204 and the process data module 206.

In the second step, the decode data module 204 processes the data 222 and determines a LUN for the data. The processed data will be sent (see step 224) to the control module 208.

The control module 208 acts as a central processor. The control module 208 provides access to the key mapping table 210.

In the third step, the control module 208 requests and retrieves security keys 230 and LUN information from the key mapping table 210. The security keys 230 would include the first key 218 that is to be transformed by the message digest module 212 into the second key. Where in compliance with SNIA recommendations to re-key on a periodic basis, the first key 218 is a time-based key. Replacement of the first key 218 can be carried out after a predefined time interval, such as on a yearly basis. The first key 218 is generated, for example, using a true random number generator (not shown), before the first key 218 is transformed. It will also be appreciated that the first key 218 can also be replaced by user intervention, such as a user entering an appropriate command into the process 200.

In the fourth step, the control module 208 sends the security keys 230, which include the first key 218, together with LUN information to the message digest module 212.

The security keys 230 also include a third key 226. In accordance with the embodiment of the present invention shown in FIG. 2, the third key 226 is transformed to obtain a fourth key 228. The fourth key 228 is assigned to the logical unit of data of the data storage device 238. The fourth key 228 is used to encrypt and decrypt the data from the data storage device 238. The third key 226 is a cryptographic key.

In the fifth step for the process 200, the transformation of the first key 218 to obtain the second key 220 and the transformation of the third key 226 to obtain the fourth key 228 both occur in the message digest module 212.

The message digest module 212 uses a hashing algorithm to transform the first key 218 and the third key 226. The hashing algorithm operates at the kernel space of the message digest module 212, where it is difficult to obtain through external probing means. In the embodiment of the present invention shown in FIG. 2, even if a hacker manages to access the key mapping table 210 to obtain information on the stored first key 218 and the stored third key 226, such information would not be sufficient to gain access to the logical unit of data associated with the first key 218 and the third key 226. This is because the hacker still would need information on the hashing algorithm used by the message digest module 212. Further, it is the second key 220 (i.e. the first key 220 after transformation by the message digest module 212) that is assigned to the logical unit of data of the data storage device and the fourth key 228 (i.e. the third key 226 after transformation by the message digest module 212) that is assigned to the logical unit of data of the data storage device.

At the end of the fifth step of the process 200, the computed hashed value keys (i.e. the second key 220 and the fourth key 228) are sent to the process data module 206.

In the sixth step of the process 200, the process data module 206 determines, from keys passed from the message digest module 212, whether the data storage device 238 is a conventional data storage device or a FDE data storage device. The determination is required for the process data module 206 in assigning the second key 220 to the logical unit of data of the data storage device 238 and in assigning the fourth key 228 to the logical unit of data of the data storage device 238.

In both the conventional data storage device and the FDE data storage device, the second key 220 is used to gain access to data stored in either of both drives through assigning the second key 220 to a logical unit of data of the data storage device 238 and using the second key 220 to read data from the data storage device 238 or to write data to the data storage device 238. Further detail on how the second key 220 is used to gain access to data stored in both the conventional data storage device and the FDE data storage device is explained with reference to FIGS. 3 and 4 respectively.

Figure 3:
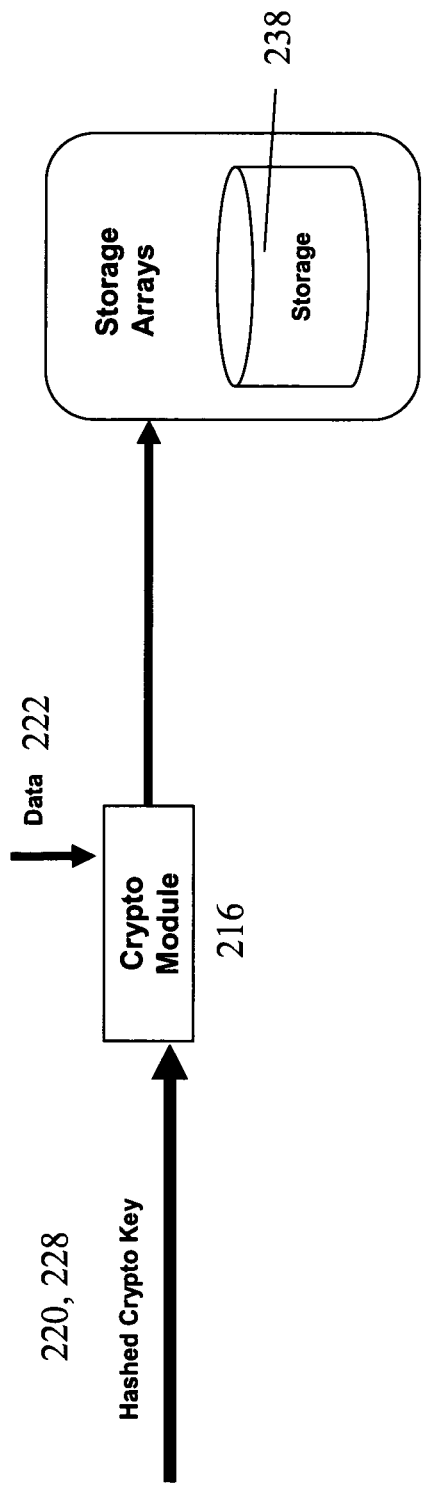
FIG. 3 is a block diagram of data flow in a cryptographic module built in accordance with one embodiment of the present invention.

FIG. 3 is a block diagram of data flow in the cryptographic module 216 built in accordance with one embodiment of the present invention. The cryptographic module 216 is used in the case where the data storage device 238 is a conventional data storage device.

Input to the cryptographic module 216 includes the second key 220, the fourth key 228 and data 222. When the second key 220 is assigned to a logical unit of data 222, a multiple key concept to prevent unauthorised access to the logical unit of data 222 is applied, in that the second key 220 acts as an additional key to the cryptographic key used by the cryptographic module 216 to encrypt and decrypt the data from the data storage device 238. As the second key is assigned to the logical unit of data 222, the second key 220 is needed to read data from the data storage device 238 or to write data to the data storage device 238. Thus, it will be appreciated that the second key 220 is used to read data from the data storage device 238 or to write data to the data storage device 238.

When re-keying is performed, for example after a predefined time interval, it is the first key 218 (see FIG. 2) that is re-keyed, whereby a new second key 220 will also be obtained. The new second key 220 assigned to the logical unit of data 222 replaces the previous second key 220. As the re-keying of the second key 220 fulfills the need for periodically changing security keys, there is no need to change the cryptographic key used by the cryptographic module 216 whenever re-keying is performed. Again, the new second key 220 would be needed to read data from the data storage device 238 or to write data to the data storage device 238.

With reference to FIG. 2, the third key 226 is a cryptographic key. The third key 226, along with the assigned LUN, is stored in the key mapping table 210 (see FIG. 2).

In addition to assigning the second key 220 to the logical unit of data 222, the cryptographic module 216 assigns the fourth key 228 (being a product of transformation of the third key 226) to the logical unit of data 222. As the cryptographic module 216 performs data encryption and data decryption, the output of the cryptographic module 216 will be cipher data assigned with the second key 220 and the fourth key 228. The cipher data blocks then exit the cryptographic module 216 using, for example, a iSCSI channel protocol or a fibre channel protocol. The cipher data blocks are then saved in the data storage device 238.

From FIG. 3, it will be appreciated that for the conventional disk storage device, as the cryptographic module 216 performs encryption and decryption of data, data encryption and the data decryption occur outside the data storage device 238. The third key 226 can be generated using at least one of the algorithms P1619, AES-XTS, AES256, AES, 3DES and DES.

Figure 4:
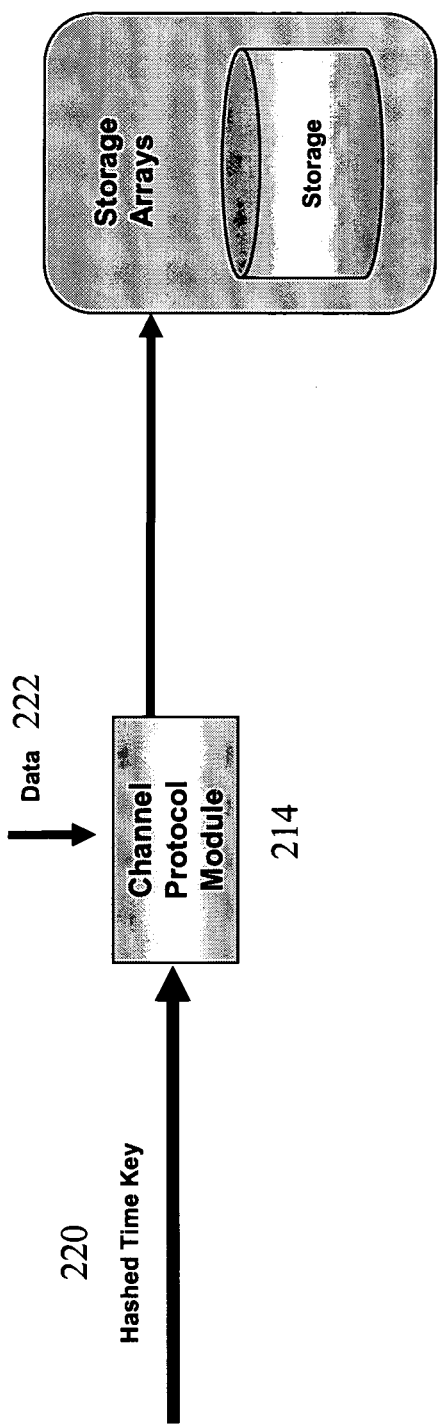
FIG. 4 is a block diagram of data flow in a channel protocol module built in accordance with one embodiment of the present invention.

FIG. 4 is a block diagram of data flow in the channel protocol module 214 built in accordance with one embodiment of the present invention. The channel protocol module 214 is used in the case where the data storage device 238 is a FDE data storage device.

Input to the channel protocol module 214 includes the second key 220 and data 222. For the FDE disk storage device, the second key 220 corresponds to the lock key of the FDE disk storage device. Thus, when a logical unit of data assigned with the second key 220 is sent by the channel protocol module 214 to the data storage device 238, the second key 220 is used to unlock the lock key of the FDE disk storage device, so that data can be read from the data storage device 238 or data can be written into the data storage device 238. Thus, it will be appreciated that the second key 220 is used to read data from the data storage device 238 or to write data to the data storage device 238.

When re-keying is performed, for example after a predefined time interval, it is the first key 218 (see FIG. 2) that is re-keyed, whereby a new second key 220 will also be obtained. The second key 220 is obtained by the message digest process 212. The new second key 220 assigned to a logical unit of data 222 replaces the previous second key 220. The logical unit of data assigned with the new second key 220 is sent by the channel protocol module 214 to the data storage device 238. The lock key of the FDE disk storage device will then be replaced with the new second key 220, as the receiving of the new second key 220 coincides with the FDE disk storage device receiving an external call to update the lock key. The re-keying of the second key 220, which in turn changes the lock key of the FDE disk storage device, fulfills the need for periodically changing security keys. After the lock key of the FDE disk storage device is replaced, the new second key 220 would be needed to read data from the data storage device 238 or to write data to the data storage device 238.

In the event where re-keying occurs after a predefined time interval, the second key 220 acts as a time-based key. The time-based key is sent together with data output from the channel protocol module 214. The output from the channel protocol module 214 is unencrypted data assigned with the time-based second key 220. Unencrypted data is output because for the FDE disk storage device, data encryption and the data decryption occur inside the data storage device 238. Thus, data read from the data storage device 238 is unencrypted and data written to the data storage device 238 is unencrypted. The protocol used by the channel protocol module 214 to communicate with the FDE data storage device is for example, but not limited to, T10, T11 and T13.

Returning to FIG. 2, it will be appreciated that the message digest module 212 acts as transformation module using a single directional transformation to transform the first key 218 to obtain the second key 220. Similarly, the message digest module 212 uses a single directional transformation to transform the third key 226 to obtain the fourth key 228.

While the embodiment shown in FIG. 2 uses hashing to transform the first key 218 to obtain the second key 220; hashing to transform a time-based first key to obtain a hashed time-based key; and hashing to transform the third key 226 to obtain the fourth key 228 so that the fourth key 228 is a hashed cryptographic key; it will be appreciated that other transformation algorithms, such as SHA256, are usable.

The hashing uses any one or more of algorithms SHA-1, SHA256 and MD5. After the second key 218 and the fourth key 228 are generated by the message digest module 212, both the second key 218 and the fourth key 228 may be stored in the key mapping table 210.

Figure 5:
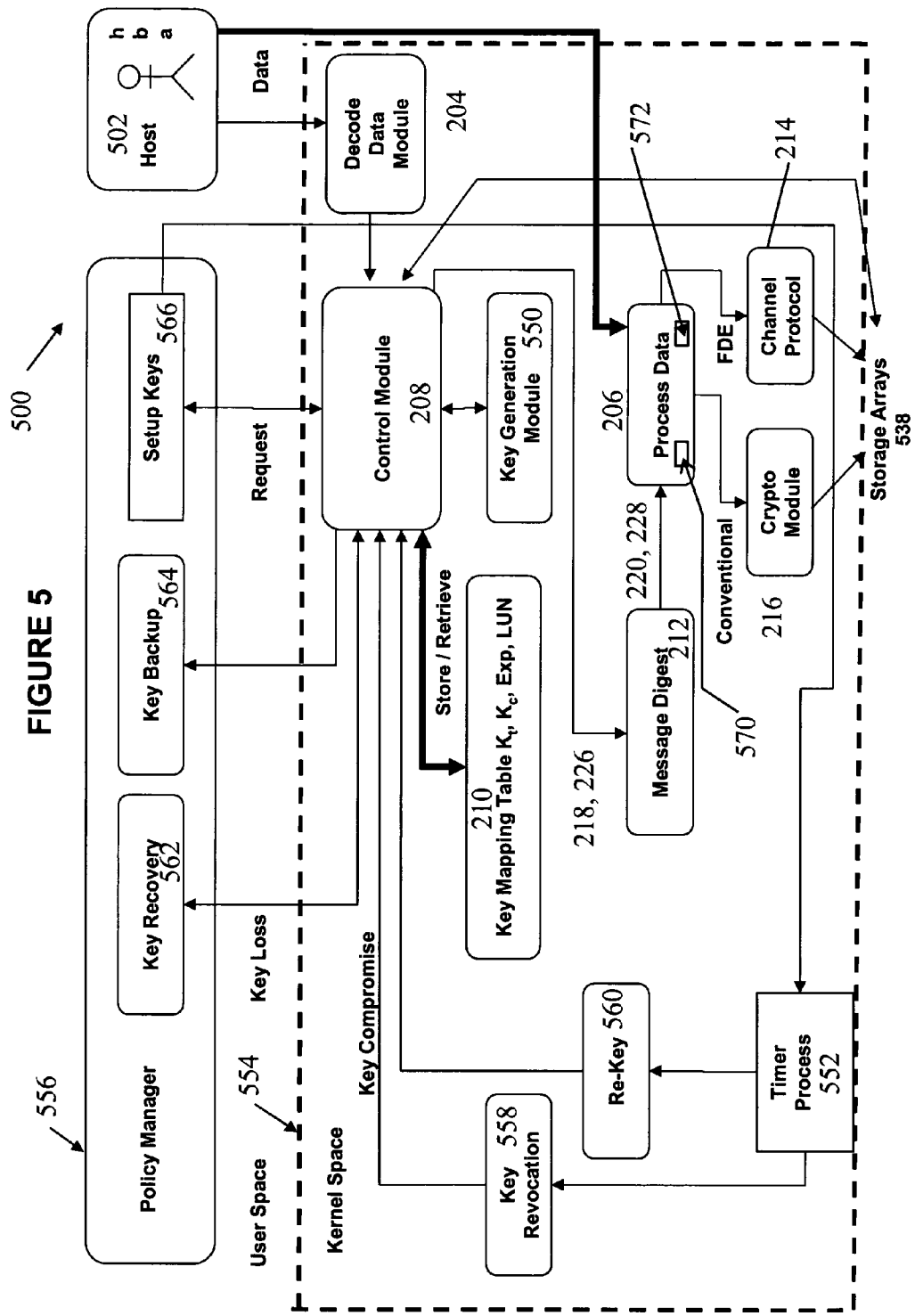
FIG. 5 is a block diagram representation of components for an architecture for a data storage system implementing one embodiment of the present invention.

FIG. 5 is a block diagram representation of components for the architecture for a data storage system 500 implementing one embodiment of the present invention.

The architecture includes a host computer 502, data security architecture 554, key policy manager 556 and a data storage module 538.

Comparing the components shown in FIG. 5 against the components shown in FIG. 1, the data security architecture 554 is analogous to the data security architecture 104, while the key policy manager 556 is implemented in the key management system 106.

The kernel space of the data security architecture 554 is designed to include the decode data module 204; the process data module 206; the control module 208; the key mapping table 210; the message digest module 212; the channel protocol module 214; and the cryptographic module 216. The functions performed by these components in FIG. 5 are similar to the components described with respect to FIGS. 2 to 4 and are therefore not further elaborated.

Thus, it will be appreciated that the data storage system 500 provides a means for accessing stored data in the data storage module 538. The message digest module 212 provides for a transformation module that transforms the first key 218 to obtain the second key 220. The process data module 206 provides an assignment module 570 that assigns the second key 220 to a logical unit of data of the data storage module 538. The process data module 206 also provides a data access module 572 that uses the second key 220 to read data from the data storage module 538 or to write data to the data storage module 538. While the assignment module 570 and the data access module 572 are separate modules in the embodiment shown in FIG. 5, it will be appreciated that an integral module may be used for both the assignment module 570 and the data access module 572.

The assignment module 570 is adapted to replace the first key 218 after a predefined time interval, so that the first key 218 is time-based. It will be appreciated that, instead of being time-based, the first key 218 can be replaced by user intervention, such as from the host computer sending an appropriate signal to the control module 208.

The data system 500 further includes an encryption module and a decryption module. The location of the encryption module and the decryption module is discussed later.

The transformation module 212 is further adapted to transform the third key 226 to obtain the fourth key 228. The assignment module 570 is further adapted to assign the fourth key 228 to the logical unit of data of the data storage module 538, wherein the fourth key is used by both the encryption module and the decryption module to encrypt and decrypt the data from the data storage module 538. The third key 226 is a cryptographic key.

The data encryption module and the data decryption module, both located inside the cryptographic module 216, are used when sending data to a conventional data storage device in the data storage module 538. Similarly, the data encryption module and the data decryption module, both located inside the cryptographic module 216, are used when receiving data from a conventional data storage device in the data storage module 538. Thus, in the case of the conventional data storage device, the data encryption module and the data decryption module are separate from the data storage module 538. The data encryption module and the data decryption module, both in the cryptographic module 216, use at least one of the algorithms P1619, AES-XTS, AES256, AES, 3DES and DES for encryption and decryption.

On the other hand, for the case of the FDE data storage device, the data encryption module and the data decryption module are housed inside the data storage module 538.

The transformation module 212 uses a single directional transformation to transform the first key 218 to obtain the second key 220. Similarly, the transformation module 212 uses a single directional transformation to transform the third key to obtain the fourth key.

Further, in the embodiment shown in FIG. 5, the transformation module 212 uses hashing to:
i) transform the first key 218 to obtain the second key 220;
ii) transform a time-based first key 218 to obtain a hashed time-based first key 220;
iii) transform the third key 226 to obtain the fourth key 228 so that the fourth key 228 is a hashed cryptographic key.

Returning to the data security architecture 554, the data security architecture 554 further includes a key generator module 550; a timer module 552; a re-key module 560; and a key revocation module 558.

The key generator module 550 is used to generate security keys, such as the first key 218 and the third key 226, for the data storage system 500. The timer process module 552 is used to trigger the re-key module 560 and the key revocation module 558. When the re-key module 560 is triggered, the re-key module 560 sends a signal to the control module 208 to have the key generator module 550 generate new security keys. When the key revocation module 558 is triggered, the key revocation module 558 sends a signal to the control module 208 to delete previously generated security keys.

The key policy manager 556 is implemented at a user space level and includes a key recovery module 562; a key backup module 564 and a key setup module 566.

The key recovery module 562 provides a means for a user to recover security keys used by the data storage system 500 in the events of key loss or key corruption. The key backup module 564 is an independent module for normal operational use. The function of the key backup module 564 is to store copies of information, such as security keys, that is available during normal operation. The key setup module 566 is activated by the control module 208 when the key generator module 550 generates security keys. The activation of the key setup module 566 is to in turn initiate the timer module 552 to monitor for an expiry date for the security keys generated by the key generator module 550. At the time of the expiry date, the timer module 552 will trigger the re-key module 560 and the key revocation module 558 as described above.

The key revocation module 558 is applied in the event that security keys are compromised. Key compromise occurs when internal or external users have, without authorisation, obtained keys and can thus have unauthorised access to data.

The following processes occur in a key management lifecycle: key generation, key distribution, key storage, key share, key recovery, key revocation and re-keying. Further detail is provided in FIGS. 6 and 7.

Figure 6:
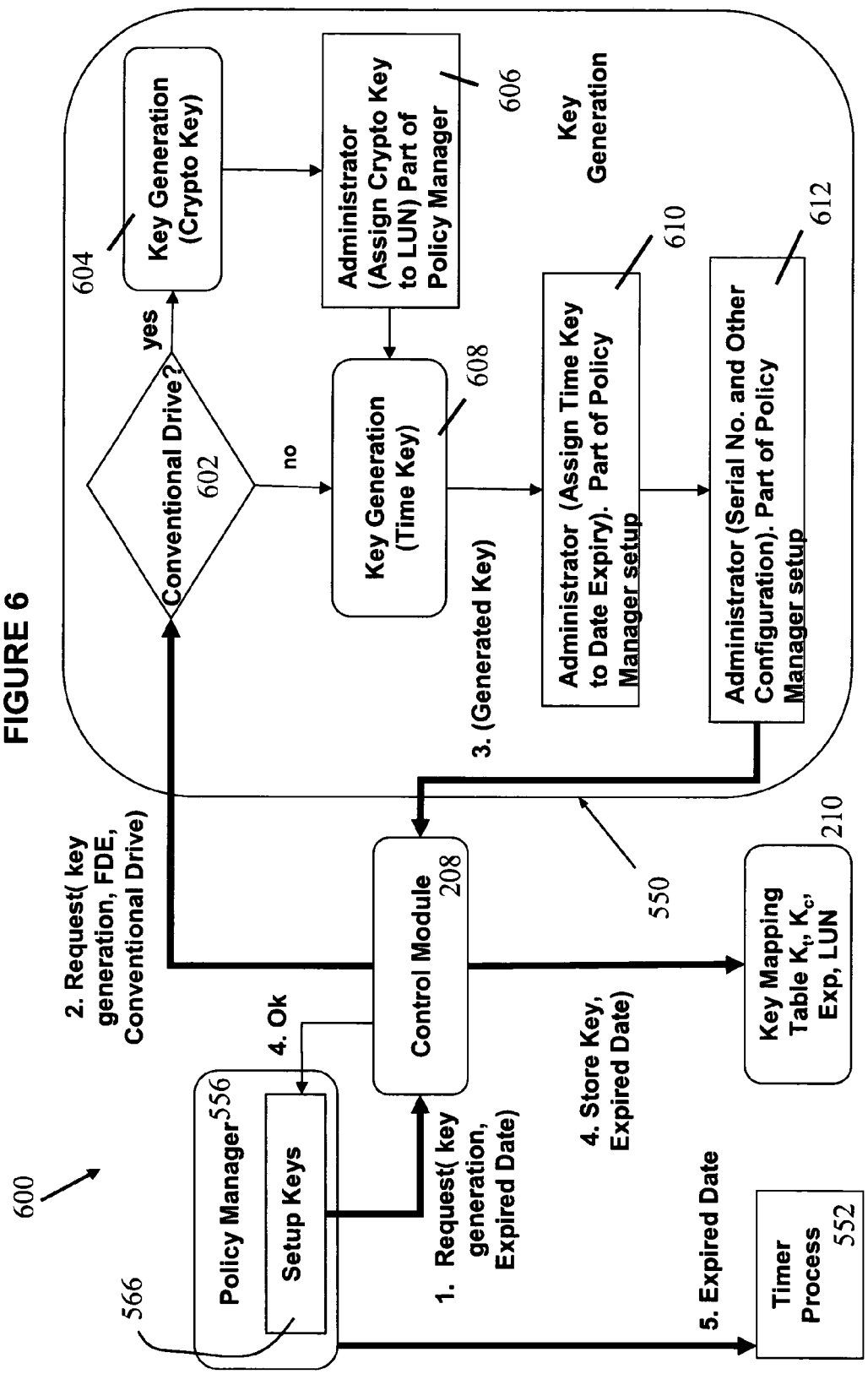
FIG. 6 shows a framework for generating security keys in accordance with one embodiment of the present invention.

FIG. 6 shows a framework 600 for generating security keys in accordance with one embodiment of the present invention.

The framework illustrates how data flows when security keys are generated by the data storage system 500 (see FIG. 5). Communication occurs between the control module 208, the key policy manager 556 having the key setup module 566, the timer module 552 and the key generation module 550.

The key policy manager 556 determines the type of data storage module 538 (refer FIG. 5), i.e. either conventional data storage device or FDE data storage device. The data storage module 538 type and a request for security keys to be generated are sent to the control module 208. An expiry date is assigned to the request to generate the security keys.

The control module 208 passes the security keys generation request to the key generator module 550 with the data storage module 538 type (i.e. either conventional data storage device or FDE data storage device).

Upon receiving the security keys generation request, the key generator module 550 initiates a process as follows. At step 602, the key generator module 550 detects whether the data storage module 538 type corresponds to a conventional data storage device. If a conventional data storage device is present, the third key 226 (i.e. a cryptographic key) is generated at step 604. At step 606, the third key 226 is assigned to a LUN. At step 608, the first key 218 (i.e. a time-based key) is generated. At steps 610 and 612, an administrator in the key policy manager 556 assigns necessary configuration information such as the expiry date from the key setup module 566.

Returning to step 602, if the key generator module 550 detects that a conventional data storage device is not present (i.e. a FDE data storage device is present instead), then the process proceeds to step 608, where only the first key 218 (i.e. a time-based key) is generated. Steps 610 and 612, as detailed above, are then executed.

A true random number generator is used to generate the first key 218 and the third key 226. The generated security keys (i.e. the first key 218 and the third key 226) and necessary configuration information are then sent to the control module 208.

The control module 208 sends the generated security keys and the necessary configuration information (including the expiry date of the security keys) for storage in the key mapping table 210. An acknowledgement signal is also sent by the control module 208 to the key setup module 566.

Finally, the key policy manager 556 notifies the timer module 552 to keep track of the expiry date of the security keys.

Figure 7:
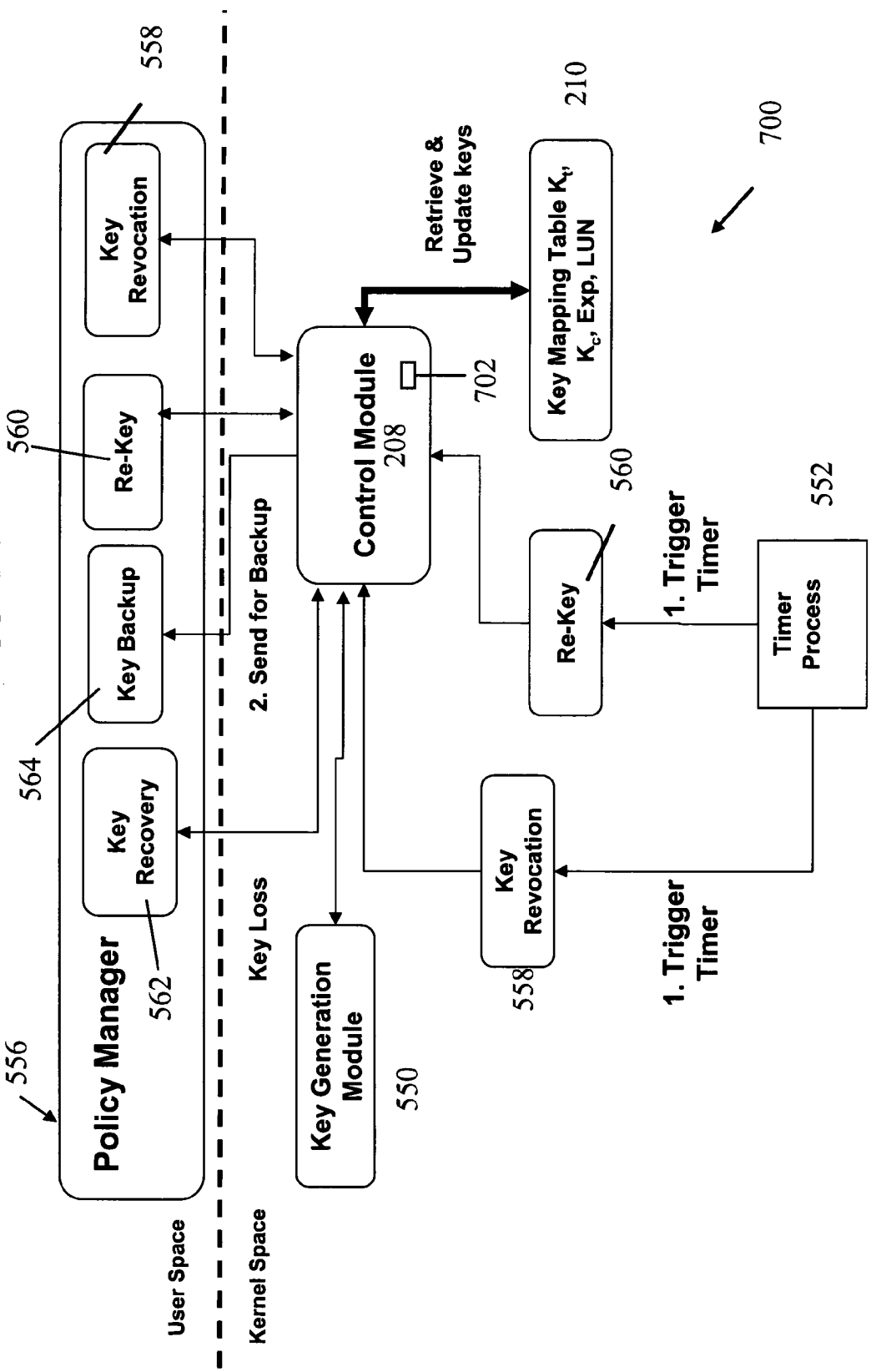
FIG. 7 shows a framework for a security key lifecycle in accordance with one embodiment of the present invention.

FIG. 7 shows a framework 700 for a security key lifecycle in accordance with one embodiment of the present invention.

In managing the lifecycle of a security key, such as the first key 218 (see FIG. 5), the following modules are used: the key policy manager 556; the control module 208; the key generator module 550; the key revocation module 558; the re-key module 560; the timer module 552 and the key mapping table 210. The key policy manager 556 further includes the key recovery module 562; the key backup module 564; the re-key module 560; and the key revocation module 558. From FIG. 7, it will be appreciated that the re-key module 560 and the key revocation module 558 are present in both the user space and the kernel space.

When the expiry date of the first key 218 has been reached, the timer module 552 will notify the re-key module 560. In the case of the key compromise, once the first key 218 is set to be expired, the timer module 552 will notify the key revocation module 558.

The triggered key revocation module 558 will cause the control module 208 to access the key mapping table 210 to delete keys, such as the expired first key 218, depending on the setting in the key policy manager 556. A key update module 702, within the control module 208, will be triggered to update other peripheral devices (not shown), such as an offsite key facility and a DSI (Distributed Security Infrastructure) key manager, with necessary key information.

The triggered re-key module 560 will cause the control module 208 to request for the key generator module 550 to generate a new first key 218. Depending on the setting in the key policy manager 556 for the re-key module 560, the control module 208 will update and replace the expired first key 218 with a new first key 218.

Any update in the key mapping table 210 will trigger the key backup module 564. The key backup module 564 will send new key information to other peripheral devices (not shown), such as the off-site backup facility and the DSI key manager.

Figure 8:
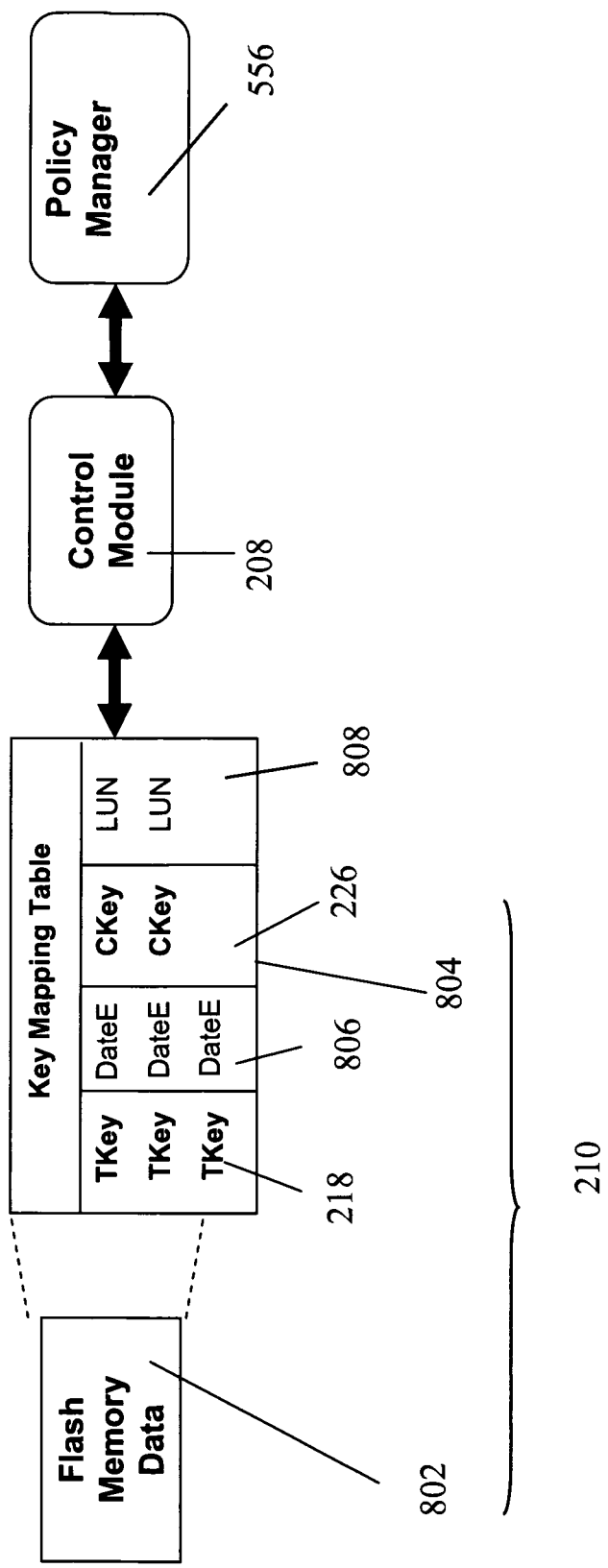
FIG. 8 shows further detail on a key mapping table and a process, in accordance with one embodiment of the present invention, to access the key mapping table.

FIG. 8 shows further detail on the key mapping table 210 and a process, in accordance with one embodiment of the present invention, to access the key mapping table 210.

The key mapping table 210 includes a mapping table 804 implemented in flash memory 802.

The mapping table 804 stores the following information: the first keys 218 (which are time-based keys) and their respective date of expiry 806; the third keys 226 (which are cryptographic keys) and their respective LUN 808; encryption appliance serial number and other necessary information.

The key mapping table 210 can only be accessed by the control module 208. Both the first keys 218 and the third keys 226 are generated by the key generator module 550 (see FIG. 5) by a true random number generator.

The control module 208 is accessed by the key policy manager 556. The frequency to change the first keys 218 is decided by the key policy manager 556.

An administrator can access and associate the date of expiry 806 and attached LUN 808 to the third keys 226. Unless the administrator wishes to re-configure the LUN 808, the third key 226 is assigned and attached only once to the LUN 808. If the LUN 808 is re-configured, the third key 226 is revoked and a new third key 226 is generated and assigned to the re-configured LUN 808.

The key mapping table 210 only stores original keys generated from the true random number generator. Referring to the fifth step of the process 200 (refer FIG. 2), a transformation algorithm, such as hashing, is used to transform the first key 218 and the third key 226 to enhance the security layer protection from an insider attack.

Figure 9:
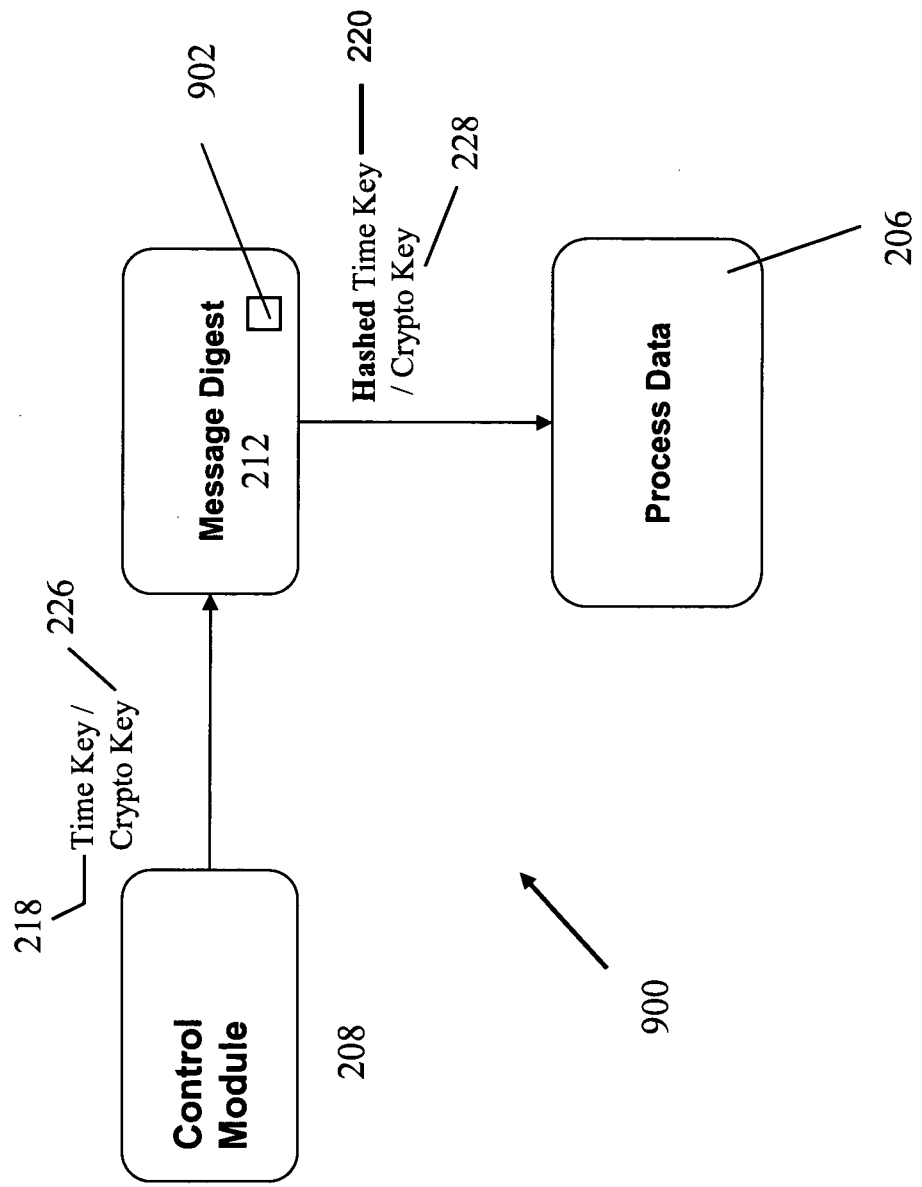
FIG. 9 shows a process, in accordance with one embodiment of the present invention, used by the message digest module.

FIG. 9 shows a process 900, in accordance with one embodiment of the present invention, used by the message digest module 212 used to transform the first key 218 and the third key 226.

The process 900 generates a unique hash key for either the first key 218 (i.e. the time-based key) or the third key 226 (i.e. the cryptographic key). The message digest module 212, acting as a transformation module, uses any one or more of hashing algorithm SHA-1 SHA256, or MD5. The hashed key could be, but not limited to, 256 bit length.

A storage module 902, such as RAM, may be used to temporally store the hashed values of the second key 220 and the fourth key 228. The location in RAM space can be further defined using kernel mode programming. This enhances the security layer protection has been enhanced from insider attacks.

The output of the message digest module 212 is determined by whether the output is to be sent to a conventional data storage device or a FDE data storage device. If the output is for a conventional data storage device, the output from the message digest module 212 would be the fourth key 228 (i.e. the hashed cryptographic key), which is assigned to a logical unit of data of the data storage device. If the output is for a FDE data storage device, the output from the message digest module 212 would be the second key 220 (i.e. the hashed time-based key), which is used to read data from a data storage device or to write data to the data storage device.

Figure 10:
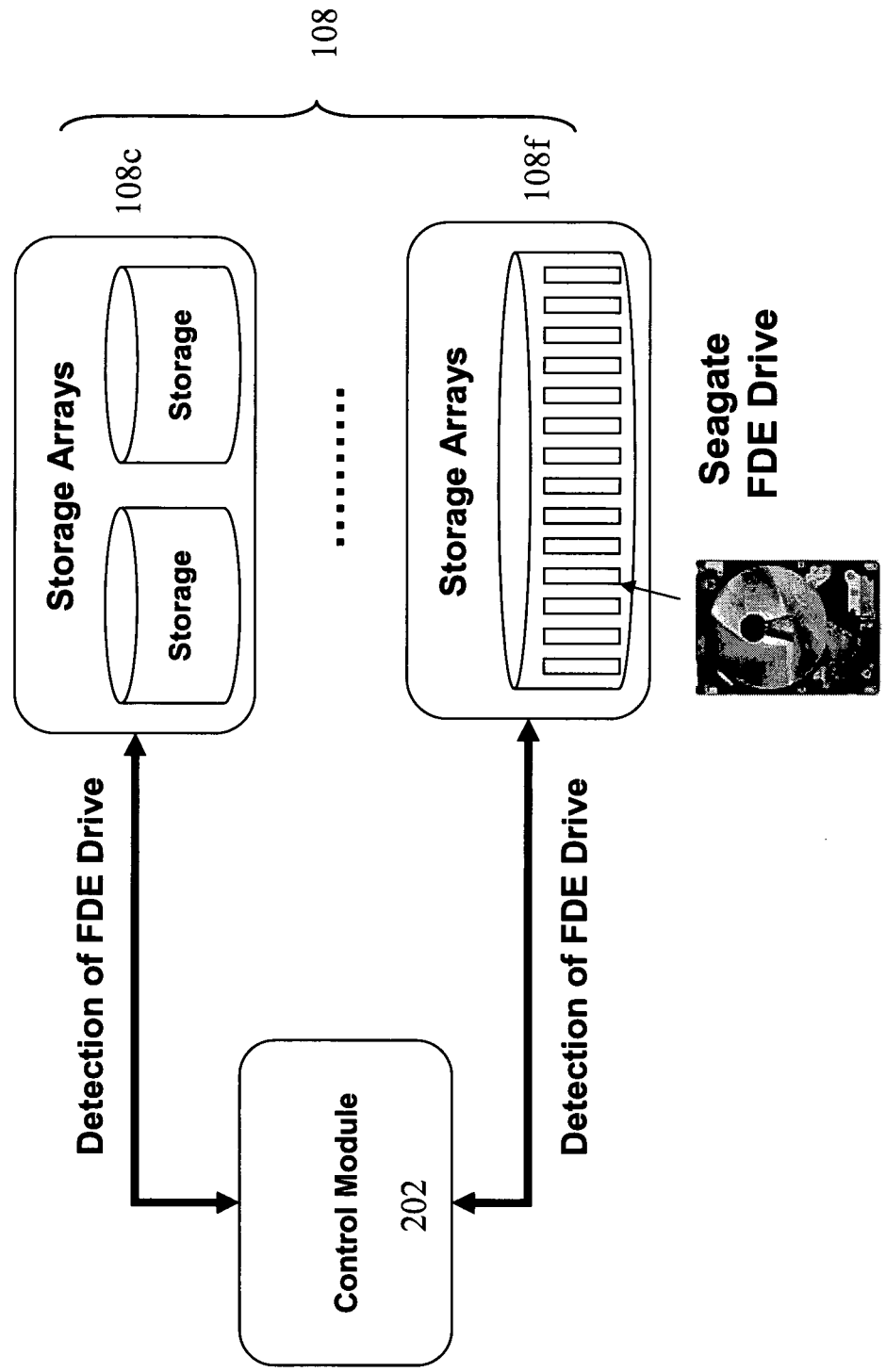
FIG. 10 is a block diagram representing detection of the type of disk storage used in data storage arrays of a data storage system implementing one embodiment of the present invention.

FIG. 10 is a block diagram representing detection of the type of disk storage used in the data storage arrays 108 of a data storage system implementing one embodiment of the present invention. From FIG. 10, it will be appreciated that the control module 202 is used to detect whether any of the disk drives in the data storage arrays 108 are FDE data storage devices or conventional data storage devices.

Referring to FIGS. 5 to 10, an integrated unit can be used to implement the transformation module 212, the assignment module 570, the data access module 572, the key generator module 550 and the storage module 902.

Figure 11:
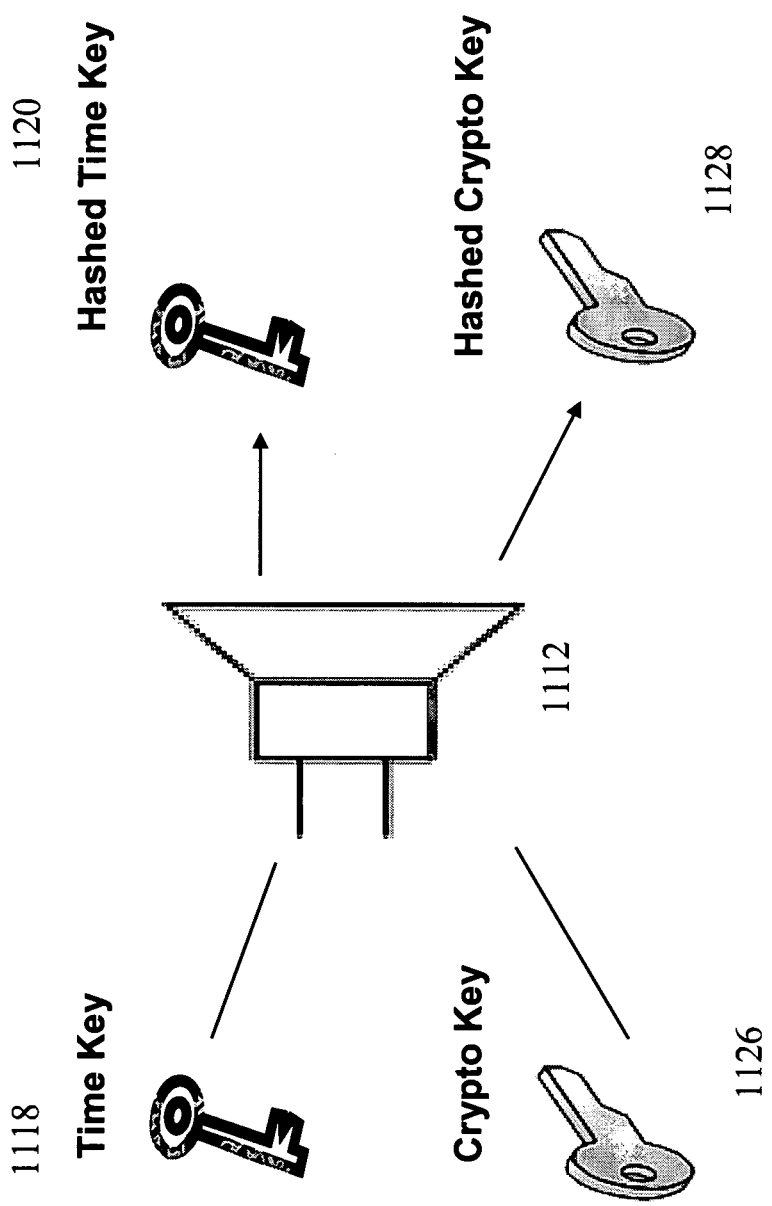
FIG. 11 illustrates transformation of security keys in accordance with one embodiment of the present invention.

FIG. 11 illustrates transformation of security keys in accordance with one embodiment of the present invention.

Transformation of the security keys (1118, 1126) is performed by a transformation module 1112 that uses hashing to perform the transformation. A first key 1118 (being a time-based key) is transformed to obtain a second key 1120 (i.e. a hashed time-based key). The second key 1120 is assigned to a logical unit of data of a data storage device. The second key 1120 is used to read data from the data storage device or to write data to the data storage device.

Further, a third key 1126 (being a cryptographic key) is transformed to obtain a fourth key 1128 (i.e. a hashed cryptographic key). The fourth key 1128 is assigned to the logical unit of data of the data storage device. The fourth key 1128 is used to encrypt and decrypt the data from the data storage device.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of accessing a data storage device, the method comprising:
   transforming a first key to obtain a second key; assigning the second key to a logical unit of data of the data storage device;
   using the second key to read data from the data storage device or to write data to the data storage device;
   transforming a third key to obtain a fourth key; assigning the fourth key to the logical unit of data of the data storage device;
   determining whether the data storage device is a conventional data storage device of or a full disk encryption data storage device;
   and if it determined that the data storage device is a conventional data storage device, using the fourth key to encrypt and decrypt the data from the data storage device;
   wherein the first key is a replaceable key and the third key is a cryptographic key which remains unchanged.

2. The method of claim 1, wherein the first key is a time-based key so that replacement of the first key is carried out after a predefined time interval.

3. The method of claim 2, wherein hashing is used to transform the time-based first key to obtain a hashed time-based key.

4. The method of claim 1, wherein before transformation of the first key, the first key is generated using a true random number generator.

5. The method of claim 1, wherein the data encryption and the data decryption occur outside the data storage device.

6. The method of claim 1, wherein the data encryption and the data decryption occur inside the data storage device, and wherein the data read from the data storage device is unencrypted and the data written to the data storage device is unencrypted.

7. The method of claim 1, wherein a single directional transformation is used to transform the first key to obtain the second key.

8. The method of claim 1, wherein a single directional transformation is used to transform the third key to obtain the fourth key.

9. The method of claim 1, wherein hashing is used to transform the first key to obtain the second key.

10. The method of claim 1, wherein hashing is used to transform the third key to obtain the fourth key so that the fourth key is a hashed cryptographic key.

11. A system for accessing stored data, the system comprising: a data storage module; a transformation module that transforms a first key to obtain a second key;
an assignment module that assigns the second key to a logical unit of data of the data storage module; a data access module that uses the second key to read data from the data storage module or to write data to the data storage module;
a process data module configured to determine whether the data storage module is a conventional data storage device or a full disk encryption data storage device;
an encryption module; and a decryption module, wherein the transformation module is further adapted to transform a third key to obtain a fourth key;
wherein the assignment module is further adapted to assign the fourth key to the logical unit of data of the data storage module, wherein if process data module determines that the data storage module is a conventional data storage device, the fourth key is used by both the encryption module and the decryption module to encrypt and decrypt the data from the data storage module;
wherein the first key is a replaceable key and the third key is a cryptographic key which remains unchanged.

12. The system of claim 11, wherein the assignment module is adapted to replace the first key after a predefined time interval.

13. The system of claim 12, wherein the transformation module uses hashing to transform the time-based first key to obtain a hashed time-based first key.

14. The system of claim 11, further comprising a key generator module to generate the first key.

15. The system of claim 11, wherein the transformation module uses a single directional transformation to transform the first key to obtain the second key.

16. The system of claim 11, wherein the transformation module uses a single directional transformation to transform the third key to obtain the fourth key.

17. The system of claim 11, wherein the transformation module uses hashing to transform the first key to obtain the second key and wherein the transformation module uses hashing to transform the third key to obtain the fourth key so that the fourth key is a hashed cryptographic key.

18. The system of claim 11, further comprising a storage module for storing the second key and the fourth key.

* * * * *